(12) United States Patent
O'Grady

(10) Patent No.: US 6,974,935 B2
(45) Date of Patent: Dec. 13, 2005

(54) ELECTRICAL CONNECTION

(75) Inventor: Patrick James O'Grady, Doncaster (GB)

(73) Assignee: Inditherm PLC, Rotherham (GB)

( * ) Notice: Subject to any disclaimer, the term of this patent is extended or adjusted under 35 U.S.C. 154(b) by 0 days.

(21) Appl. No.: 10/959,462

(22) Filed: Oct. 6, 2004

(65) Prior Publication Data

US 2005/0077287 A1    Apr. 14, 2005

Related U.S. Application Data

(63) Continuation-in-part of application No. 09/857,241, filed on Jun. 1, 2001, now Pat. No. 6,814,889.

(30) Foreign Application Priority Data

Dec. 4, 1998    (GB)    .................................... 9826596

(51) Int. Cl.⁷ .............................................. H05B 3/08
(52) U.S. Cl. ...................... 219/541; 439/886; 439/887
(58) Field of Search ................................ 219/541, 543, 219/549, 203, 522, 528, 553; 338/306–309; 439/886–887

(56) References Cited

U.S. PATENT DOCUMENTS

| | | |
|---|---|---|
| 4,265,789 A | 5/1981 | Christopherson et al. |
| 4,629,584 A | 12/1986 | Yasuda |
| 4,820,446 A | 4/1989 | Prud'Homme |
| 4,874,549 A | 10/1989 | Michalchik |
| 4,974,594 A * | 12/1990 | Berlin ........................ 600/395 |
| 5,073,840 A * | 12/1991 | Coors ........................ 361/760 |
| 5,250,228 A | 10/1993 | Baigrie et al. |
| 5,336,113 A * | 8/1994 | Chanteau .................... 439/581 |
| 5,902,518 A | 5/1999 | Khazai et al. |
| 6,373,028 B2 * | 4/2002 | Williamson et al. ........ 219/212 |
| 6,800,001 B1 * | 10/2004 | Costa ........................ 439/888 |

FOREIGN PATENT DOCUMENTS

| | | |
|---|---|---|
| EP | 0344734 A1 | 12/1989 |
| WO | WO 92/04718 | 3/1992 |
| WO | WO 94/24678 | 10/1994 |

* cited by examiner

Primary Examiner—Robin O. Evans
Assistant Examiner—Vinod Patel
(74) Attorney, Agent, or Firm—Trexler, Bushnell, Giangiorgi, Blackstone & Marr, Ltd.

(57) ABSTRACT

A device for connecting a source of electrical power to a coating or film incorporating carbon particles, an objective met by providing a coating of a nickel compound to the coating or film of carbon particles, and applying to the nickel coating a tin-copper tape coated with a silver-loaded conductive adhesive. What results is a uniform heating effect over a relatively wide area, substantially free from hot and cold spots or areas.

5 Claims, 5 Drawing Sheets

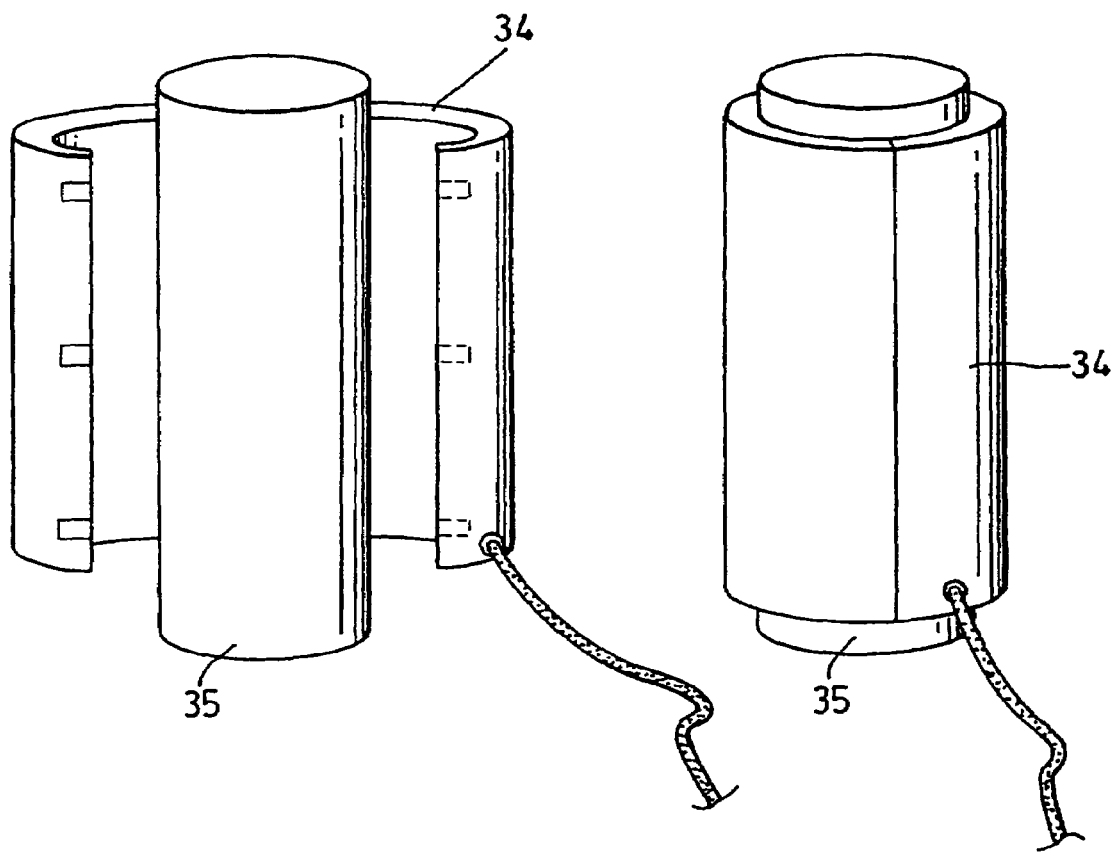
*Fig. 6*  *Fig. 7*

ELECTRICAL CONNECTION

RELATED APPLICATION (PRIORITY CLAIM)

This application is a continuation-in-part of U.S. application Ser. No. 09/857,241, filed Jun. 1, 2001 now U.S. Pat. No. 6,814,889, which claims the benefit of British application Ser. No. 9826596.0, filed Dec. 4, 1998.

BACKGROUND OF THE INVENTION

This invention relates to an electrical connection and is particularly concerned with an electrical connection to conductive materials that can serve the purpose of a heating means.

It has long been known that materials that are electrically conductive can generate heat. This phenomenon has spawned a considerable number of heating means for a considerable number of different purposes.

Whilst electrical heaters at large are generally successful, and more than capable of meeting their intended purpose, what has proved to be difficult, is the achieving of a uniform heating effect over a relatively wide area, substantially free from hot and cold spots or areas.

There have been attempts hitherto to create electrical heaters in sheet or web form to serve a wide variety of purposes. However, the most usable form of conductive material is in the form of carbon particles or carbon black embedded in or coated on a carrier or substrate. To attempt to achieve a uniform heating effect, a greater density or concentration of carbon particles is employed, but as a direct result of that, the material becomes less pliable and more brittle, to the detriment of the employment of the material over a wide range of potential uses.

In U.S. patent application Ser. No. 09/857,241 of which the present Application is a continuation-in-part, there is described and claimed a flexible electrically heatable semi-conductive material able to be used in a variety of different physical forms to suit a wide variety of electrical conduction heaters, with a substantially constant and controllable heating effect over the full length and width of the heatable material.

The preparation of the said conductive material and the manner of its application to a carrier is such that a visually smooth coating or film is provided. However, it remains so that the coating or film will exhibit a microscopic degree of roughness with peaks and troughs formed by carbon particles at the exposed surface. It is then important to pay special attention to the provision of an electrical connection to the coat or film.

BRIEF SUMMARY OF THE INVENTION

The object of the present invention is to provide a means of connecting a source of electrical power to a coating or film incorporating carbon particles.

According to the present invention, an electrical connection to a coat or a film incorporating carbon particles, comprises an area of the coat or film provided with a coating of a nickel compound, and a tin-copper tape coated with a silver-loaded conductive adhesive applied to the coating of nickel-compound.

With the electrical connection installed, the sheet or web can be connected to a suitable power source with the substantial guarantee that there will be no shorting or arcing at the point of electrical connection, or elsewhere along its length and width and consequently no damage by the creating of hot spots.

Dependant on the use to which the sheet or web is put, an electrical connection can be provided over long lengths to opposite edges, to assist in the even input of power to the coat or film over a wide area, by locating a conductive rail on the silver loaded conductive tape. Desirably, the conductive rail is overlaid by an antifaying compound, preferably wider than the rail.

An important aspect of the invention is that the totally uniform heating effect achievable in the coat or film with an effective electrical connection can be with relatively low power, e.g. 24 volts, and by controlling the width between the electrodes or rails, and the thickness of the coat or film, a constant temperature can be achieved and maintained, at any required level to serve a particular purpose.

In its form as a flexible sheet or web, an outer insulating layer can be sprayed on to form a water/fluid resistant electrical insulator encapsulating the carbon particle coat or film and the electrical connection. Suitable materials may be polyurethane, silicone or acrylic elastomers. The invention has a considerable number of available uses. It can be wrapped round an article the temperature of which is to be maintained and equally can be incorporated into clothing for use in extremely cold climates, to maintain the temperature of the wearer.

However, the fabric has significant benefits when used in medical contexts. It can be incorporated in a mattress or as a blanket for an operating table or for a bed in the recovery ward for raising and maintaining the temperature of patients following surgery.

It is possible to employ the fabric in sleeping or carrying bags for use by rescue services to give immediate aid to accident victims suffering from hyperthermia.

In all such uses, the low voltage required means that there is total safety to the user. The voltage and coat or film thickness can determine the maximum and constant temperature across the full width and length of the fabric.

The arrangement may be that power is supplied to the electrically conductive heater until such time as its required temperature is reached and then maintained at that temperature by an appropriate switching arrangement to switch power ON and OFF as required. It is however preferred for power to be supplied as a series of pulses of predetermined time, with intervening periods where power is switched off for predetermined periods of time, to allow temperature sensing to take place. Irrespective of the form of power supply, the invention allows highly efficient use of electrical power, enhanced by the electrical connection of the invention.

In addition to being able to control maximum temperatures by voltage control by control of the spacing between electrodes and by coating thickness it is a highly advantageous feature of the invention that the predetermined maximum temperature to suit the application is achieved in reasonable time from the onset of power, after which the temperature is regulated and maintained at its predetermined level. This can be of considerable importance not only in medical contexts but also in such as the food industry and particularly in food processing where a required temperature must be achieved quickly and maintained.

The electrical connection of the invention may be applied to a flexible semi-conductive material comprising finely divided carbon particles uniformly dispersed in an elastomeric polymer there being carbon particle levels of 20% by weight to 75% by dry weight to 80% to 25% by dry weight of elastomeric polymer levels. The material may also include an anti-adsorption compound.

Carbon particle levels of 20% to 40% by dry weight to 80% to 60% by dry weight of carrier levels can be used.

The semi-conductive film or coating may comprise a carbon filled elastomeric polymer, preferably with carbon particle levels of 43% to 73% by dry weight to 57% to 27% by dry weight polymer levels, preferably 60% by dry weight to 65% by dry weight. Further preferably, the carbon particle level is 57% by dry weight.

The elastomeric polymer may be an aliphatic polyurethane in solution, and desirably the carbon particles are mixed without milling prior to the addition thereto of the polyurethane solution.

If required in particular applications, flame retardant materials may be provided.

A method of forming a compound for a flexible electrical semi-conductive heater to which the electrical connection is to be applied comprises stirring fine carbon particles into a polymer base containing an anti-adsorption compound, to achieve carbon particles to polymer levels of 20% by dry weight to 75% by dry weight to 80% to 25% by dry weight of polymer, and subjecting mixture to high speed stirring for a pre-determined period of time, with the maintenance of the mixture below a predetermined level, to grind the carbon particles to a predetermined final fineness. The predetermined level may be at not more than 25° C.

The required carbon particle level may be 20% to 40% by dry weight to polymer level but preferably carbon levels are from 43% to 73% by dry weight to polymer, and more particularly 57% by dry weight.

The resultant mixture exhibits thixotropic rheological properties, and if required, the viscosity of the mixture can be reduced, by the addition of a suitable solvent such as dimethylformamide.

Preferably the carbon black particles have particulate size of approximately 30 En nm. Suitable adsorbents may be selected from the group containing polypropylene glycols, and polyethylene glycols of a required molecular weight. After this process is complete a suitable polymer solution e.g. an aliphatic polyurethane is added to the master batch such that the ratio of polymer to carbon black is 1:0.57 on a dry basis. The finished compound is then refiltered prior to any coating process.

The duration of the slow stirring-in of carbon black is not critical, but desirably high speed stirring is limited to not more than 30 minutes.

Once the mixture is prepared, it is checked by taking a sample and passing it through a 200 mesh filter, preferably with the aid of a low pressure displacement pump, and checked by using a Heckman gauge, to ensure that there has been no agglomeration of the carbon particles during mixing. If any agglomeration is detected, the mixture should be subjected to further high speed stirring.

Preferably, the prepared start or batch material is subjected to a final filtration step by passing the mixture through a 300 mesh filter cloth, for example by way of a slow, low pressure positive displacement pump, at which stage there should be no residue left on the filter cloth that would signal that there was still a degree of remnant agglomeration of carbon particles.

In the form where the start or batch material employs dimethylformamide as the solvent and polyethylene or propylene glycol as the polymer base, it constitutes an ideal material to serve as a coating or a base or carrier material.

A web or sheet may be formed by applying a quantity of finished compound as discussed above to a release paper by way of transfer coating, to achieve a uniform coating or film of compound between 90 and 100 grams per square meter dry weight, and subjecting the web or sheet to heat progressively rising from 110° C. to 150° C. to achieve the controlled release of solvents and provide a coating or film free of pinholes, to which the electrical connection of the invention is subsequently applied.

As the electrical conductivity, and hence the heating effect achievable is a function of coating or film thickness the above process is repeated until a desired thickness of coating or film is created.

At this stage considerable care must be exercised to ensure that reticulation is avoided, and as it is preferred to spread the finished compound on the release paper by employing a doctor blade, equally considerable care exercised to ensure the avoidance of the presence of dirt or grit on the blade edge, to prevent the creation and spread of lines of indentations in the coating or film.

Desirably, the release paper is matt grade and is an unembossed silicone-coated paper.

A flexible fabric able to serve the purpose of an electrical conductive heater may be formed by taking the release paper mentioned above with its coating of finished compound spreading thereon a further quantity of said compound, laying the release paper on a flexible fabric carrier sheet or web, and passing the composite through a fixed gap roller to ensure controlled penetration of said compound into the fabric of the sheet or web, the sheet or web thereafter being subjected to heat progressively rising from 110° C. to 150° C. to achieve controlled release of solvents and provide a coating of film free of pinholes to which the electrical connection of the invention is applied. Also possible is the direct application of a coating of finished compound directly on to a fabric carrier.

Such a sheet or web can be of any desired length, and of any width with the limits of available fixed gap rolls.

By the nature of the coat or film, there is a substantially totally even spread of carbon black at loadings in the polymer material considerably beyond that which has hitherto been believed to be possible whilst at the same time leaving the fabric with its film or coat totally flexible.

The fabric may be a knitted cotton material but can be of any other suitable form, such as a weft knitted polyvinyl alcohol fabric.

BRIEF DESCRIPTION OF THE DRAWINGS

One embodiment of the invention will now be described with reference to the accompanying drawings, in which:

FIGS. 6 and 7 are schematic illustrations of a blanket essentially as shown in FIG. 1 formed as a wrapping or a surround for a product structure or pipe;

DETAILED DESCRIPTION OF THE INVENTION

Figure 1:
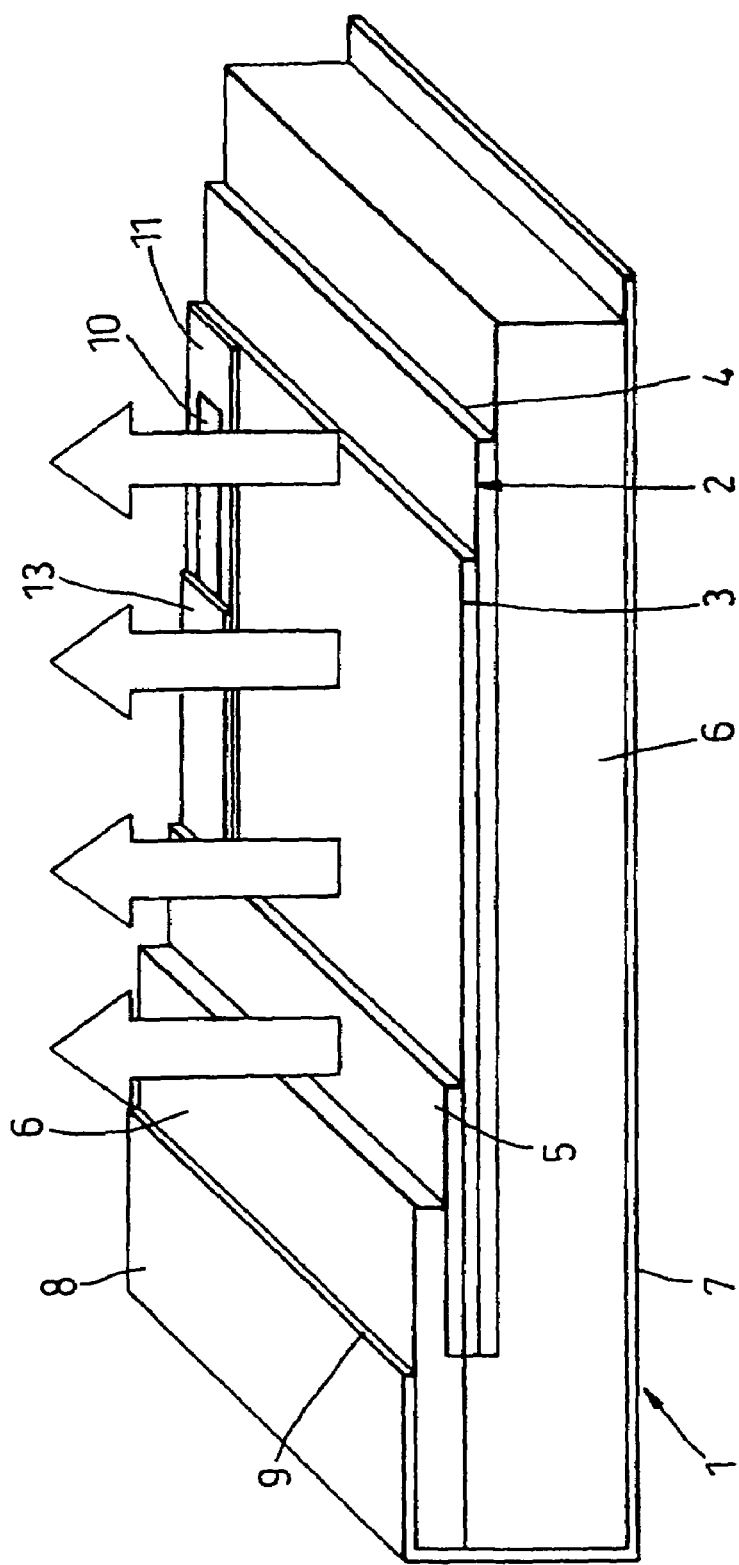
FIG. 1 is a schematic part sectional perspective view of a mattress or blanket containing a conductive material in accordance with the invention.

In FIG. 1, a blanket or mattress 1 has a core 2 formed by conductive material 3 on a fabric support 4. The conductive material was produced by the method hereinbefore defined, and applied to the fabric layer as a series of coatings, with each coating heated to 110° C. to 150° C. by passing through an oven or a series of ovens before the application of a succeeding coating. For medical use, the coating can be 144 microns thick. The conductive material 3 on its fabric support 4 is overlaid by an electrical insulating layer 5, and both encased in a flame retardant insulation 6, of greater thickness to the rear or non-operative side 7 than to the front or operative side 8.

The whole composite is encased in an outer casing 9 of a polyurethane material, and the edges fully sealed around the full periphery of the blanket or mattress, to ensure that the blanket or mattress is totally waterproof, and readily cleanable and sterilisable.

On the conductive material 3 and below the electrical insulating layer 5, is a conductive tape 10 which, as is shown more particularly by FIG. 2, lies along the edges of the conductive material along its two longer lengths. For medical use, the spacing between the rails may be 460 mms.

Figure 3:
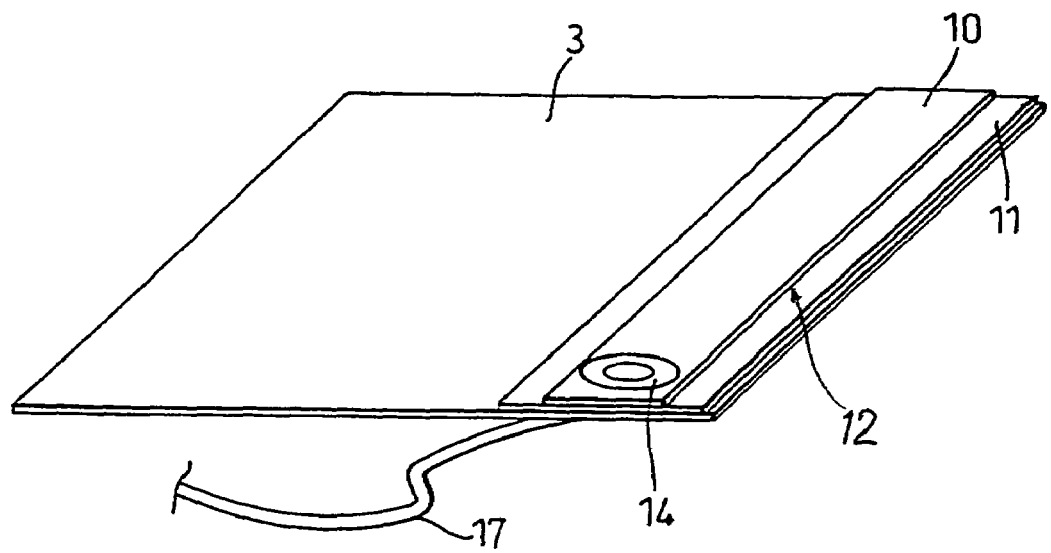
FIG. 3 is an upper and view of an electrical connection to the conductive material.
Figure 4:
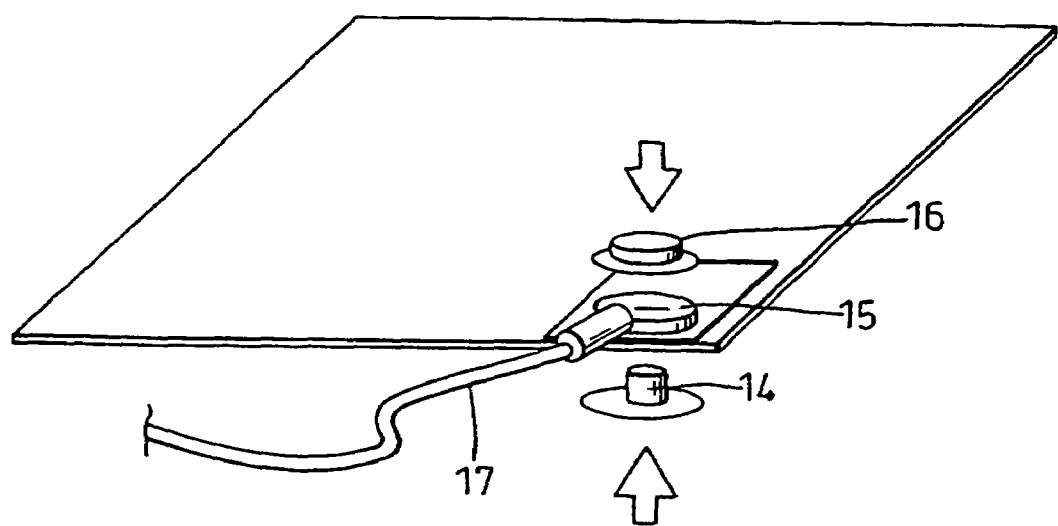
FIG. 4 is an exploded perspective view of the electrical connector of FIG. 3.
Figure 5:
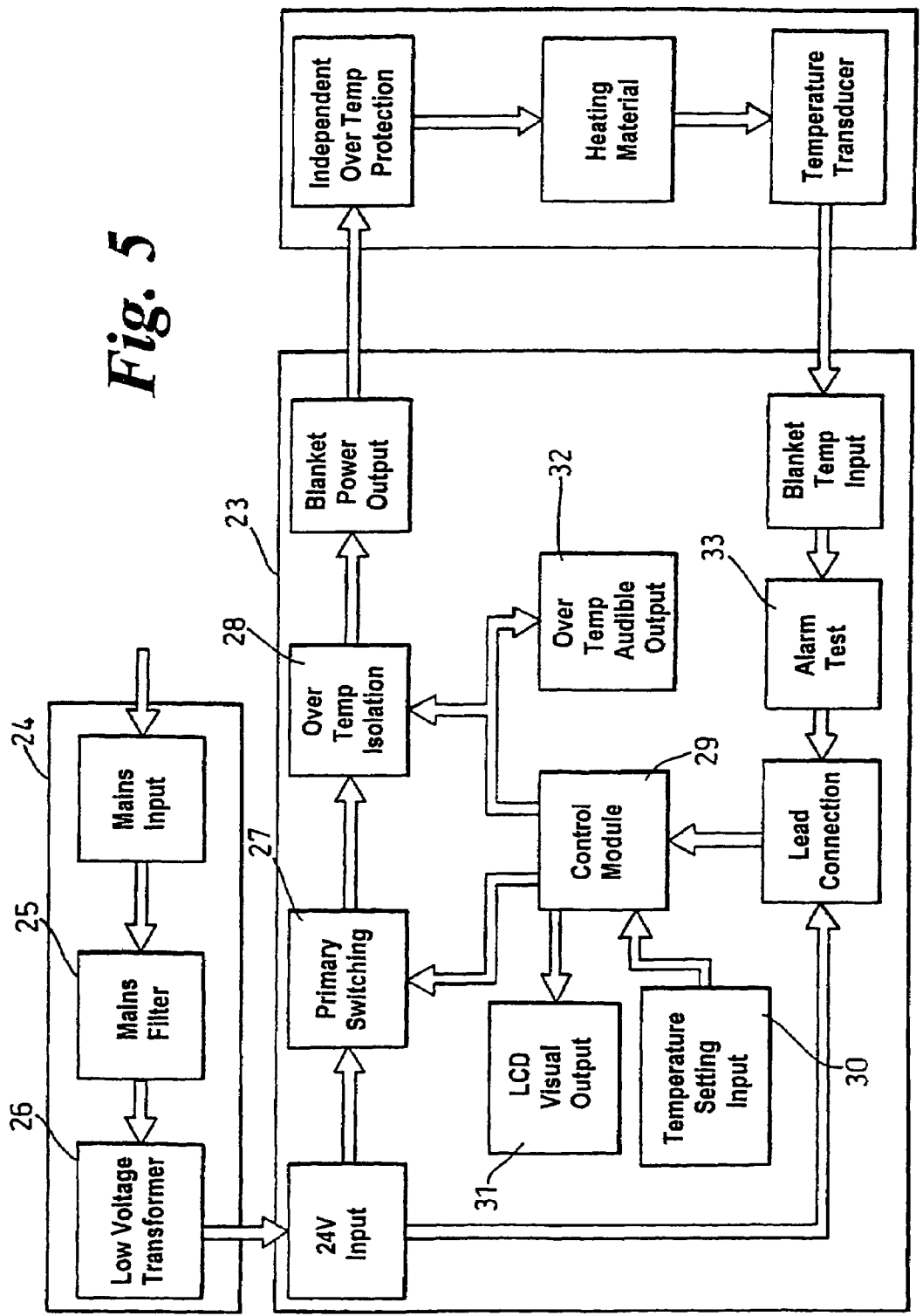
FIG. 5 is an electrical block diagram illustrating an electrical circuit able to cause the heating of and the maintenance of a constant temperature in the conductive material.

The provision of a guaranteed electrical connection to the conductive rail is of particular importance, and arcing or shorting of the electrical supply must be avoided. As shown in FIGS. 1, 3 and 4 this is achieved by applying a coating 11 of nickel over the length and width of the conductive material to be occupied by the conductive tape 10 on to which is applied a silver loaded adhesive tape 12 to which the conductive tape 10 is attached and by which the conductive tape 10 is attached to the nickel coating. Overlaying the tape 10 is an antifaying compound 13 to guarantee the absence of any electrical arcing. Extending through co-operating apertures in the conductive layer, the nickel coating and the conductive tape is a conductive stud 14 extending to a stud base 15 soldered to the rear face of the conductive material 3, the stud passing through the fabric backing to cap 16, the cap being crimped to provide a connection to an electrical lead 17. FIG. 5 is an exploded view showing the connection.

Figure 2:
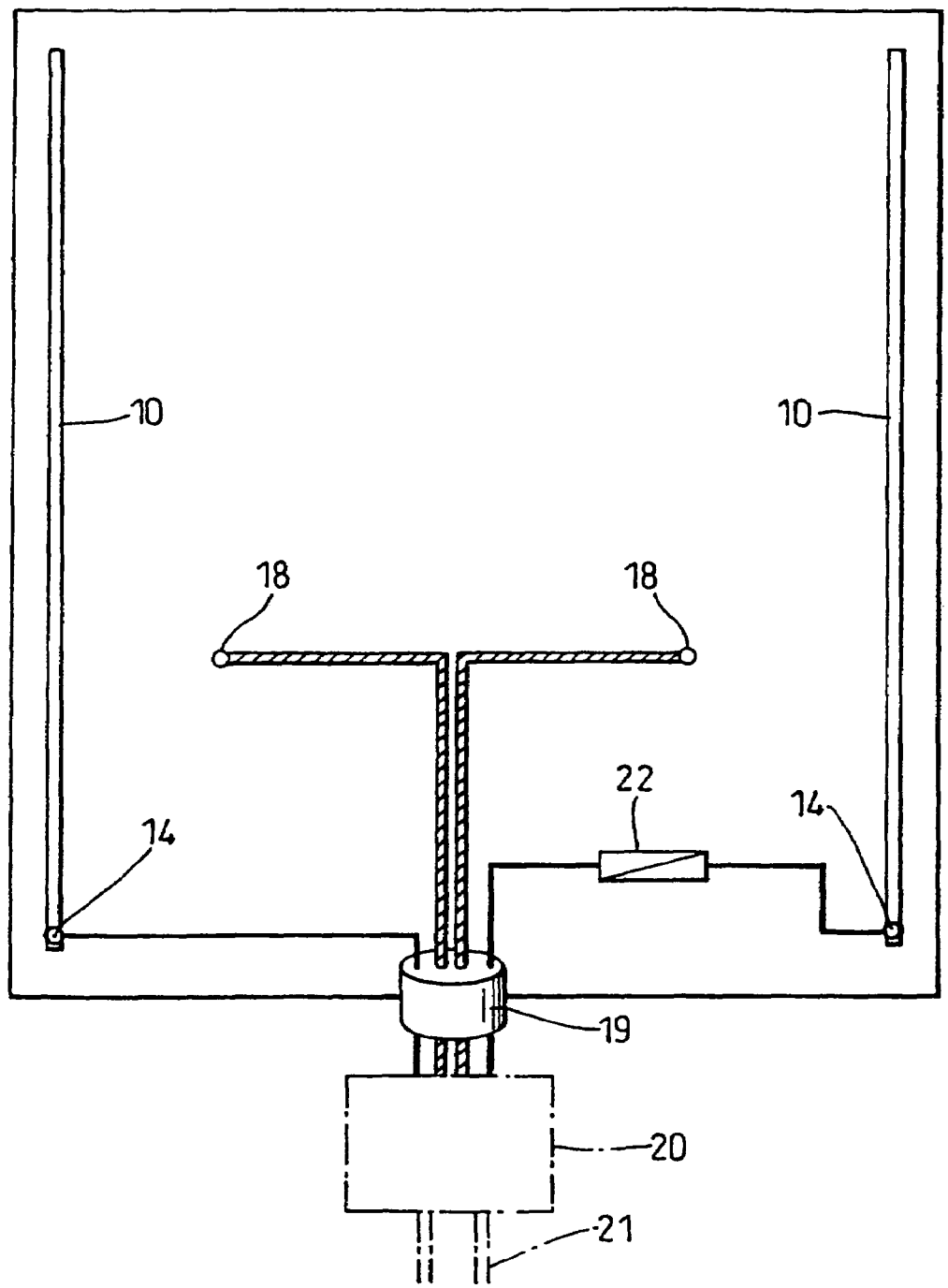
FIG. 2 is a schematic plan view of a mattress or blanket as in FIG. 1.

As indicated in FIG. 2, thermocouples or thermistors 18 chosen to suit a particular use of the blanket or mattress (thermistors for sensitive applications and thermocouples for more robust applications), are strategically located on the conductive material, with leads extending to a connection 19. As indicated in FIG. 5, there is a control unit 20, from where emerge electrical leads 21 for the conductive studs 14, there being a one shot, or resettable fuse 22 provided in the lead extending to one of the conductive studs 14.

The blanket or mattress discussed above is ideally suited to medical use to serve as a mattress or overlay for an operating table in a theatre or a recovery bed in a recovery room, or as a blanket to overlie a patient. Here the more sensitive thermistor would be employed to sense the temperature of the mattress overlay or blanket. As indicated in FIG. 5, the mattress overlay or blanket is connected to a control unit 23 in turn connected to a transformer unit 24 that itself is connected to a mains supply. This ensures that low voltage supply, preferably at 24 volts is supplied to the mattress overlay or blanket.

FIG. 5 illustrates in block diagram form the electrical circuit from the mains to the blanket or mattress. At the transformer unit 24, there is the mains input leading to a filter 25 and the low voltage transformer 26. This ensures the feeding of 24 volt supply to the control unit 23. From the inlet, power is supplied to a switching circuit 27, and then to an over temperature isolation circuit 28 from where it progresses to a power output for connection to the mattress overlay or blanket as has been described above. Simultaneously, power is supplied to a control module 29 having a temperature control means 30 and outputs connected to a visual alarm 31 an audible alarm 32 and to the switching circuit 27. The temperature sensing thermistors (or thermocouples) 18 on the mattress overlay or blanket are connected to the control unit 23, to provide signals to the temperature isolation circuit 28 denoting temperature. An alarm test 33 is provided on the unit, the alarm test being connected to the control module, and able to simulate an over temperature condition.

Immediately prior to the onset of operations, the temperature control means is set to a temperature required of the blanket or mattress, typically average human body temperature. The transformer unit and hence the control unit and mattress overlay/blanket are connected to a mains supply, and the alarm test activated to confirm that all circuits are active.

The switching circuit is such that at the outset, power is supplied to the mattress overlay or blanket for a predetermined period of time, typically one minute and switched off for a second predetermined period of time, typically 10 seconds. During the period that power is switched off, the temperature sensed by the thermistors 18 is signaled via the control module 29 to the over temperature isolation circuit 28, and if the temperature sensed is lower than the pre-set temperature, power is repeatedly switched on and off and the temperature sensed, until the temperature of the blanket or mattress is that required. When in that condition, power is held off until a fall in temperature of the blanket or mattress is sensed.

With a patient on the mattress overlay, or wrapped in the blanket, any fall in body temperature causes an extraction of heat from the mattress or blanket, immediately sensed by the thermistors, and signals sent to the over temperature control circuit and switching circuit to cause the pulsed supply of power to recommence until such time as the temperature of the blanket or mattress recovers to the pre-set level.

By virtue of the method of producing the carbon laden material at its carbon to polymer density, and as a consequence of the manner of its application to a support fabric, there is the substantially uniform heating over the whole area of the blanket, with a substantially total elimination of hot and cold spots the result of which is that there is total support for the body heat of a patient over his or her full height and width, ensuring that body temperature control crucial to a patient during operations and subsequent recovery, is maintained.

In the most unlikely circumstances that the blanket or mattress should overheat, both the visual and audible alarms are activated, and the over temperature isolation circuit switched to prevent further power supply to the blanket or mattress. To guard against over temperature being consequent on a momentary surge of power, over temperature sensed during a first ten second switch-off of power can be caused to be ignored, and activation of the alarms and temperature isolation circuit activated only if over temperature is sensed during the second of two successive periods of switch-off of power and temperature sensing.

The above described construction of blanket or mattress and its control, whilst ideally suited to medical applications, can be used without essential changes for other more industrial uses.

As is schematically suggested in FIGS. 6 and 7 a generally rectangular construction 34 of essentially the same nature as is illustrated in FIG. 1 can be used to wrap round an item 35 that needs to be heated.

That item could be a domestic hot water tank, when a uniform heating effect is provided over its whole height, to the considerable benefit of the saving of power by creating a more rapid heat up from cold and a far more efficient maintenance of the temperature of water in the tank.

The item could be e.g. pipework in, e.g. the food industry where the invention can provide both an insulating lagging of pipework through which heated and fluid foodstuffs must flow and the provision of uniform heating over the full pipe work length. Not only does this have major importance during normal operations, but should there be the need to close down operations for any reasons, foodstuffs can solidify. Hitherto, solidified oil-based products in pipe lines has been a major problem. With the invention, recommencement of the provision of heat to the blanket and hence to the pipework has the effect of gently and speedily re-heating the foodstuff to bring it back to a fluid state when flow can recommence.

The item could equally be one of outdoor use in extremely cold climates such as for example valves and pumps, that can be encased in the material of the invention to maintain them at a temperature that allows them to function normally no matter what the ambient temperature might fall to.

What is claimed is:

1. An electrical connection to a coat or a film incorporating carbon particles comprising an area of the coat or film provided with a coating of a nickel compound, and a tin-copper tape coated with a silver-loaded adhesive applied to the coating of the nickel compound.

2. An electrical connection as in claim 1, wherein the tin-copper tape is overlaid by an antifaying compound.

3. An electrical connection as in claim 2, wherein the antifaying compound is of a width greater than that of the tin-copper tape.

4. An electrical connection as in claim 1, wherein co-operating apertures are provided through the coat or film containing carbon particles, the coating of nickel compound and the tin-copper tape through which extends a conductive stud from a stud base secured to the rear of the coat or film to a cap, the cap being secured to the stub whereby to secure an electrical lead to the stud and to the tin-copper tape.

5. An electrical connection as in claim 4, wherein the coat or film incorporating carbon particles is applied to a flexible support material, the flexible support material having a hole to co-operate with the holes in the coat or film and in the tin-copper tape, to allow the passage of the stud, the stud base being secured to the face of the support material opposite to the face provided with the coat or film containing carbon particles.

* * * * *